United States Patent [19]

Scharman

[11] Patent Number: 5,722,780
[45] Date of Patent: Mar. 3, 1998

[54] CAGE FOR ROLLING ELEMENT BEARING

[75] Inventor: Matthias Scharman, Heidenfeld, Germany

[73] Assignee: SKF Industrial Trading & Development Company B.V., Nieuwegein, Netherlands

[21] Appl. No.: 762,061

[22] Filed: Dec. 9, 1996

[30] Foreign Application Priority Data

Dec. 8, 1995 [NL] Netherlands ............... 1001860

[51] Int. Cl.⁶ ....................................... F16C 33/41
[52] U.S. Cl. ................................. 384/531; 384/526
[58] Field of Search ............................. 384/523, 526, 384/531, 532, 533, 572, 576, 580

[56] References Cited

U.S. PATENT DOCUMENTS

| | | | |
|---|---|---|---|
| 3,157,443 | 11/1964 | Draudt | 384/532 X |
| 4,019,790 | 4/1977 | Earsley et al. | |
| 4,169,636 | 10/1979 | Hooper | 384/531 X |
| 4,225,199 | 9/1980 | Earsley | |
| 5,118,207 | 6/1992 | Ikejiri et al. | 384/527 |

FOREIGN PATENT DOCUMENTS

| | | | |
|---|---|---|---|
| 993520 | 11/1951 | France | 384/531 |
| 3 635 261 | 7/1987 | Germany | |
| 3 821 613 | 12/1989 | Germany | |
| 833847 | 5/1960 | United Kingdom | |
| 2104600 | 3/1983 | United Kingdom | 384/531 |

*Primary Examiner*—Thomas R. Hannon
*Attorney, Agent, or Firm*—Young & Thompson

[57] ABSTRACT

A cage for a rolling element bearing, comprising elastically deformable prongs, each pair of prongs defining a cage pocket in which a rolling element can be accommodated by snapping-in. The thickness dimension of each prong, perpendicular with respect to its surface facing the corresponding cage pocket, is gradually diminishing, in the direction towards the free end of the prong. Preferably, the thickness dimension of each prong is diminishing, in general, according to a parabolic function. Thereby, the highest possible retaining force for the rolling elements is obtained, and yet the strains in the prongs upon assembly of the rolling elements are as low as possible.

5 Claims, 3 Drawing Sheets

CAGE FOR ROLLING ELEMENT BEARING

The invention is related to a cage for a rolling element bearing, which cage comprises elastically deformable prongs, each pair of prongs defining a cage pocket in which a rolling element can be accommodated by snapping-in.

Cages, generally of a polymeric material, with elastically deformable prongs or so-called snap-type cages offer the possibility to assemble or de-assemble a cage by simply snapping each rolling element into or out of its respective pocket. Thereby the advantage is obtained that both the cage itself as well as the assembling process of the bearing equipped therewith are greatly simplified. In some cases, the snap-connection is the only device holding the cage in the bearing.

In assembling such cages and the rolling elements involved, care should be taken to keep the strain in the cage as low as possible so as to avoid permanent deformation or even fracture of the prongs. Yet, despite the demand For low strain at the assembly stage, in use the prongs should be able to exert a high retaining force on the rolling elements.

The object of the invention is to provide a cage which is optimized in such a way that the highest possible retaining force is obtained and yet the strains in the prongs upon assembly are as low as possible. This object is achieved in that the thickness dimension of each prong perpendicular with respect to its surface facing the corresponding cage pocket is gradually diminishing in the direction towards the free end of said prong.

Preferably, the thickness dimension of each prong is diminishing, in general, according to a parabolic function. If only the bending stress in the prong is considered, the thickness dimension could obey an exact parabolic function. However, upon insertion of an element into the cage pocket, the prongs are compressed somewhat along their median line, whereby a compression stress is generated which is more or less constant over the cross-sectional surfaces of the prong. When taking account of these compression stresses, which are only small in comparison to the maximum bending stresses, advantageously a prong thickness function is obtained which only slightly differs from a parabolic function.

In this respect, according to a first possibility of cages in which the prongs are the only device holding the cage in the bearing, good results are obtained in case the length dimension L of each prong, measured from its root towards its free end along a median line of the prong, and the thickness dimension $h_o$ of said root are selected in such a way that the conditions:

$$\epsilon_{bending,max} = \frac{3}{4} \cdot \frac{W_L}{L^2/h_0} < 4.5\%$$

and $$\frac{E_{stored}}{E \cdot B \cdot R^2 [\epsilon_{bending,max}]^2} = \frac{h_0 \cdot L}{9 \cdot R^2} \geq 2.2 \cdot 10^{-2}$$

are satisfied, in which:

L=length measured along a median line of the prong
$h_o$=thickness dimension at the root of the prong
$w_L$=maximum deflection at the free end of the prong
$\epsilon_{bending,\ max}$=maximum bending strain at $w_L$
$E_{stored}$=elastic bending energy stored in the beam (one beam) at maximum opening $W_L$
E=E-Modulus
B=Width of the beam
R=Radius of rolling element According to a second possibility, related to cages in which the prong assures that cage and rolling elements can be safely handled as one unit, for example during assembly or possible de-assembly of the bearing, the following conditions should be satisfied:

$$\epsilon_{bending,max} = \frac{3}{4} \cdot \frac{W_L}{L^2/h_0} < 4.0\%$$

and $$\frac{E_{stored}}{E \cdot B \cdot R^2 [\epsilon_{bending,max}]^2} = \frac{h_0 \cdot L}{9 \cdot R^2} \geq 2.5 \cdot 10^{-3}$$

The above shapes may, for example, be applied both in cases wherein the prongs are radially directed, and in cases wherein the prongs are axially directed.

The invention will further be explained with reference to some embodiments shown in the figures.

FIG. 3 shows a detailed view of a cage pocket and a ball during the process of snapping in.

Figure 1:
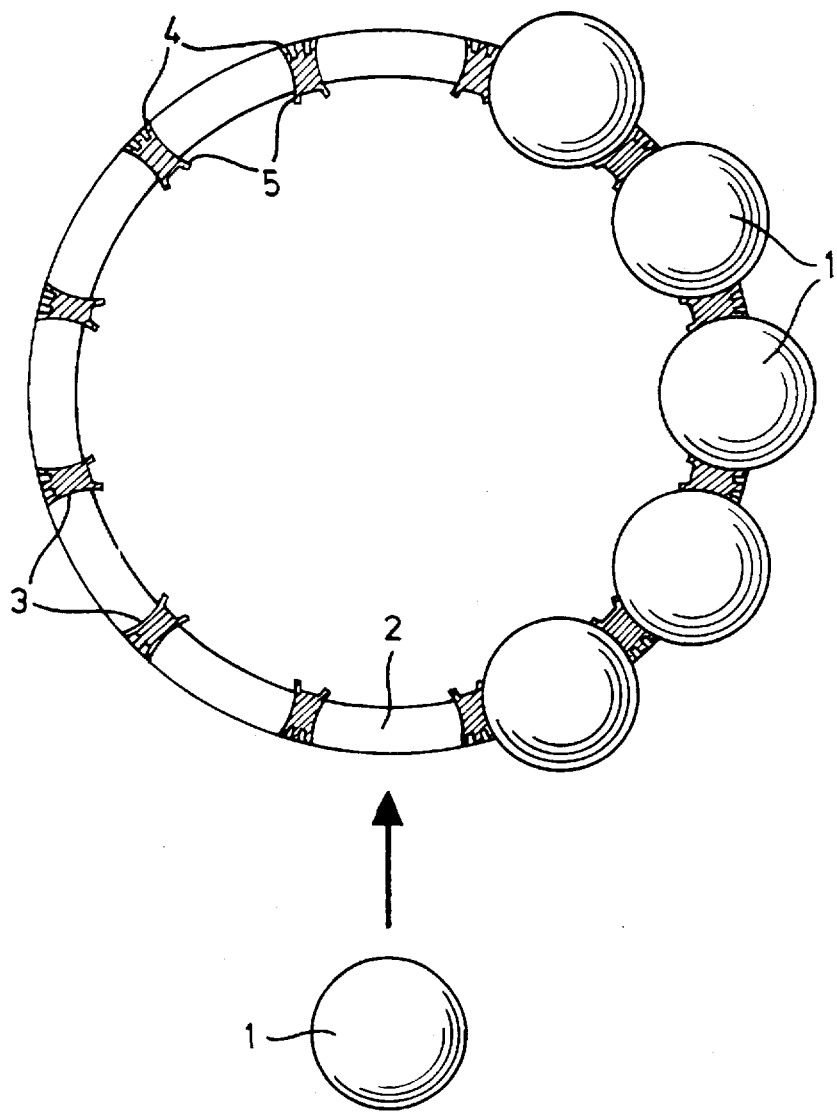
FIG. 1 shows an axial view from the first embodiment of a snap type cage.

In the cage as is shown in FIG. 1, the balls 1 are snapped into cage pockets 2. To that end, each cage pocket is surrounded by cage bodies 3 which have a first pair of prongs 4 and a second pair of prongs 5. Upon assembly, the ball 1 pushes prongs 4 or 5 away from each other. Subsequently ball 1 snaps into the pocket defined by cage bodies 3, and prongs 4 and 5 resiliently move back to their original position. In this way, all cage pockets 2 of the cages can accommodate a ball 1. In such (radially assembled) cages, the assembly can take place via the radially outer or via the inner side of the cage.

Figure 2A:
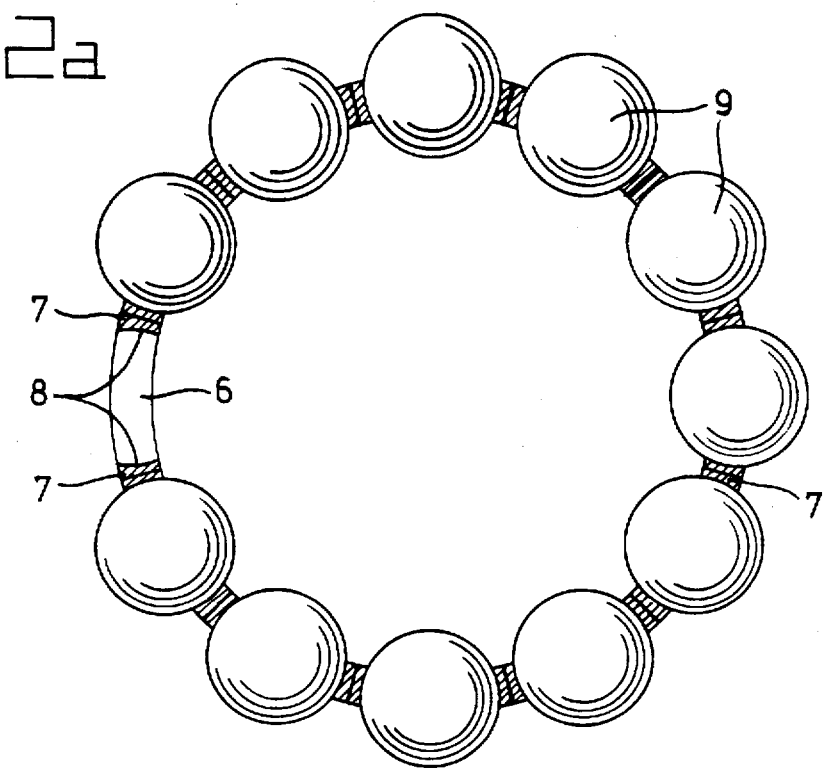
FIGS. 2a and 2b show a second embodiment of a snap type cage.
Figure 2B:
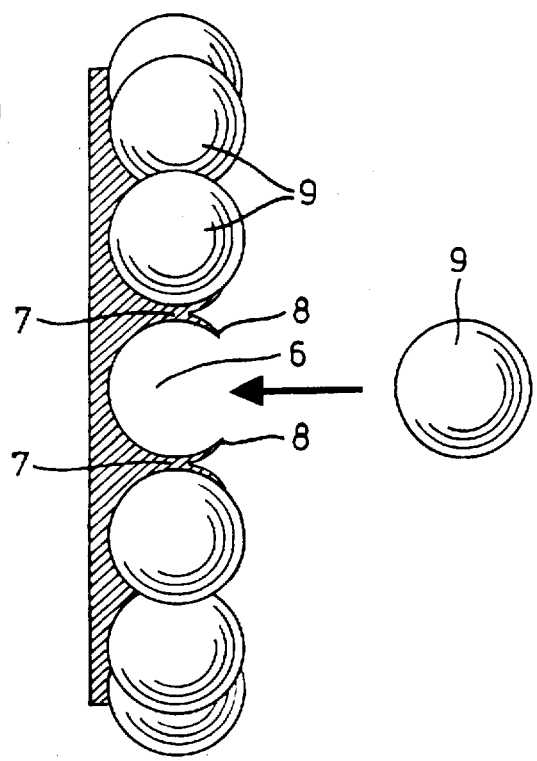

FIGS. 2a and 2b show a cage having cage pockets 6 which are each enclosed by cage bodies 7. Each cage body has one pair of prongs 8. The balls 9 are pressed axially in the cage pockets 6, by resiliently pushing away from each other the respective prongs 8. After full accommodation of ball 9 in pocket 6, the prongs 8 resiliently move back to their original position, thus holding the ball 9 in its cage pocket 6.

Although the FIGS. 2a and 2b show a process whereby only one ball at a time is to be accommodated in the cage, the normal assembly takes place in one go, that is all balls are snapped into their respective pockets at the same time. This is a normal procedure when the balls are already contained in the bearing.

Furthermore, it is important to note that, in the embodiment of FIGS. 2a and 2b, the prongs are the only means by which the cage is held in the bearing.

According to the invention, the geometric shape of the cage pocket retaining prongs should have the highest possible retaining force $F_{max}$ and the lowest possible strain $\epsilon_{max}$ for a given maximum displacement $u_{max}$, whereby $u_{max}$ is defined as the maximum displacement of a ball/roller out of its pocket such that said ball/roller will still be pushed back into said pocket by the resilient action of the prongs as soon as the force leading to such displacement diminishes. Obviously, a large $u_{max}$ is favorable for reliably holding the balls/rollers (or cage). In order to achieve these goals, the stress distribution during assembly should be harmonized and minimal, while the flexible bending stiffness of the cage retaining prongs at the same time should be maximal.

Figure 3:
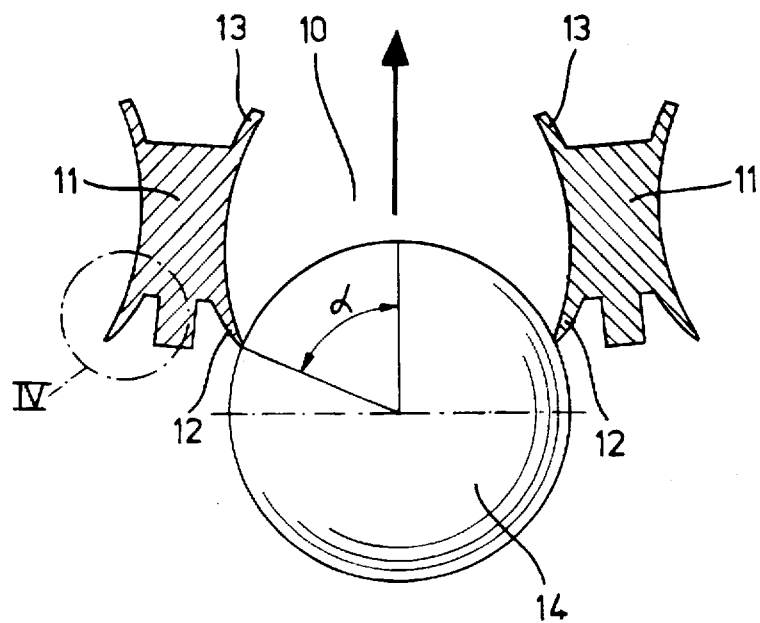
Figure 4:
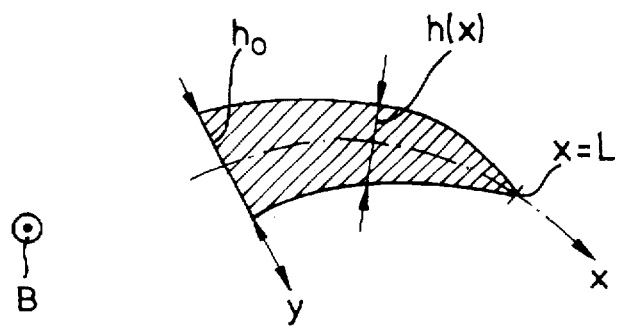
FIG. 4 shows an enlarged view of the prong according to IV of FIG. 3.

Reference is made to the shape of the prongs as more clearly shown in FIGS. 3 and 4. FIG. 3 shows a cage pocket 10, enclosed by cage bodies 11. Cage bodies 11 both have two pairs of prongs 12 respectively 13.

The point of initial contact between prongs 12 (alternatively also 13) and ball 14 is indicated by angle α.

The smaller the angle α is, the larger is the distance by which the prongs 12 (13) have to be pushed out of each other upon snapping ball 14 in cage pocket 10 and the larger also the distance $U_{max}$ of the ball/rolling element out of its pocket—from which on the ball/rolling element is still pushed back into its pocket. Thereby, a high displacement $U_{max}$ of the ball/rolling element out of its pocket is possible—without the ball completely falling out. In other words, even though the ball has been moved relatively far out of its pocket, the prongs will still push it back.

The design of the cage pocket prongs and also the E-modulus of the material thereof determine the quality of the snap connection, that is the retaining force and the straining. With reference to the definitions given in FIG. 4, both the length L and the width B of prongs should be as high as possible. Furthermore, h (x) should be about a parabolic function of the position along the axis x which defines the median line of the prong. The thickness of the prong $h_o$ at its root should be selected in such a way that a certain tolerable strain $\epsilon_{max}$ takes place upon assembly.

An optimal cage pocket design, i.e. whereby the maximum retaining force is obtained and the strain is kept as low as possible is guaranteed in case L and $h_o$ are selected as described before.

I claim:

1. Cage for a rolling element bearing, which cage comprises elastically deformable prongs, a pair of said prongs defining a cage pocket in which a rolling element can be accommodated by snapping-in, the thickness of each prong perpendicular to a surface of the prong facing an adjacent cage pocket gradually diminishing, in a direction toward a free end of said prong, the length L of each prong, measured from a root of said prong toward said free end along a median line of the prong, and the thickness $h_o$ of said root being selected in such a way that the conditions:

$$\epsilon_{bending,max} = \frac{3}{4} \cdot \frac{w_L}{L^2/h_0} < 4,5\%$$

and $$\frac{E_{stored}}{E \cdot B \cdot R^2 [1\epsilon_{bending,max}]^2} = \frac{h_0 \cdot L}{9 \cdot R^2} \geq 2,2 \cdot 10^{-2}$$

are satisfied, in which:
L=length measured along a median line of the prong
$h_o$=thickness at the root of the prong
$w_n$=maximum deflection at the free end of the prong
$\epsilon_{bending,\ max}$=maximum bending strain at $w_L$
$E_{stored}$=elastic bearing energy stored in the prong at $w_L$
E=Modulus of elasticity of the prong
B=Width of the prong
R=Radius of a said rolling element.

2. Cage according to claim 1, wherein the thickness of each prong is diminishing according to a parabolic function.

3. Cage according to claim 1, wherein said length L of each prong and said thickness $h_o$ of said root are selected in such a way that the conditions:

$$\epsilon_{bending,max} = \frac{3}{4} \cdot \frac{w_L}{L^2/h_0} < 4.0\%$$

and $$\frac{E_{stored}}{E \cdot B \cdot R^2 [\epsilon_{bending,max}]^2} = \frac{h_0 \cdot L}{9 \cdot R^2} \geq 2.5 \cdot 10^{-3}$$

are satisfied.

4. Cage according to claim 1, wherein the prongs are radially directed.

5. Cage according to claim 1, wherein the prongs are axially directed.

* * * * *